US011524439B2

(12) United States Patent
Higuchi et al.

(10) Patent No.: US 11,524,439 B2
(45) Date of Patent: Dec. 13, 2022

(54) METHOD FOR MANUFACTURING FILM, FILM, LAMINATED BODY, AND PACKAGING MATERIAL

(71) Applicant: AGC Inc., Tokyo (JP)

(72) Inventors: Yoshiaki Higuchi, Tokyo (JP);
Shintaro Fukunaga, Tokyo (JP);
Takatoshi Yaoita, Tokyo (JP)

(73) Assignee: AGC Inc., Tokyo (JP)

( * ) Notice: Subject to any disclaimer, the term of this patent is extended or adjusted under 35 U.S.C. 154(b) by 62 days.

(21) Appl. No.: 17/070,999

(22) Filed: Oct. 15, 2020

(65) Prior Publication Data
US 2021/0023757 A1    Jan. 28, 2021

Related U.S. Application Data

(63) Continuation of application No. PCT/JP2019/031976, filed on Aug. 14, 2019.

(30) Foreign Application Priority Data

Aug. 24, 2018    (JP) .............................. JP2018-157183

(51) Int. Cl.
*B29C 48/08*    (2019.01)
*B29C 48/88*    (2019.01)
(Continued)

(52) U.S. Cl.
CPC .......... *B29C 48/08* (2019.02); *B29C 48/9155* (2019.02); *B32B 27/08* (2013.01);
(Continued)

(58) Field of Classification Search
CPC .............. B29C 48/9155; B29C 44/505; B29C 48/0019; B29C 48/0018; B29C 48/0014; B29C 48/0011; B29C 48/001; B29C 48/08
See application file for complete search history.

(56) References Cited

U.S. PATENT DOCUMENTS 5,833,070 A * 11/1998 Mizuno ..................... C08J 5/18
206/524.1

FOREIGN PATENT DOCUMENTS

JP    02-116546 A    5/1990
JP    05-185506 A    7/1993
(Continued)

OTHER PUBLICATIONS

International Search Report dated Nov. 12, 2019 in PCT/JP2019/031976 filed on Aug. 14, 2019, 2 pages.
(Continued)

*Primary Examiner* — Stella K Yi
(74) *Attorney, Agent, or Firm* — Oblon, McClelland, Maier & Neustadt, L.L.P.

(57) ABSTRACT

To provide a process for producing a film excellent in water vapor barrier property, tensile elongations, and transparency. A resin material containing polychlorotrifluoroethylene (PCTFE) is melted and extruded into a film from an extrusion die, the extruded product is brought into contact with a cooling roll having a surface temperature of at most 120° C. in a state such that the surface temperature of the extruded product is higher than the crystallization temperature of PCTFE to form a film web, and the film web is subjected to heat treatment at from 80 to 200° C. to obtain a film.

16 Claims, 2 Drawing Sheets

(51) Int. Cl.
   B32B 27/08    (2006.01)
   B32B 27/30    (2006.01)
(52) U.S. Cl.
   CPC .. *B32B 27/304* (2013.01); *B29C 2948/92209* (2019.02); *B29C 2948/92704* (2019.02); *B32B 2250/02* (2013.01); *B32B 2307/412* (2013.01); *B32B 2307/418* (2013.01); *B32B 2307/54* (2013.01); *B32B 2307/546* (2013.01); *B32B 2307/72* (2013.01); *B32B 2307/7246* (2013.01); *B32B 2327/12* (2013.01); *B32B 2439/80* (2013.01)

(56) References Cited

FOREIGN PATENT DOCUMENTS

| | | |
|---|---|---|
| JP | 06-511271 A | 12/1994 |
| JP | 2007-508962 A | 4/2007 |
| JP | 2015-098168 A | 5/2015 |

OTHER PUBLICATIONS

"Honeywell Aclar® UltRx4000," Honeywell International Inc., 2010, 1 page.

"JIS K 7136:2000 Plastics—Determination of haze for transparent materials," Japanese Standards Association, Feb. 29, 2000, 7 pages (with partial English language translation).

"Standard Test Method for Haze and Luminous Transmittance of Transparent Plastics," ASTM, Designation: D 1003-97, Apr. 1998, 4 pages.

"Standard Test Method for Tensile Properties of Plastics," ASTM, Designation: D 638-99, Feb. 2000, 7 pages.

"Standard Test Method for Tensile Properties of Thin Plastic Sheeting," ASTM, Designation: D 882-97, Apr. 1998, 5 pages.

"JIS K 7129-2:2019 Plastics—Film and sheeting—Determination of water vapour transmission rate—Part 2: Infrared detection sensor method," Japanese Standards Association, Jan. 21, 2019, 8 pages (with partial English language translation).

"Standard Test Method for Water Vapor Transmission Rate Through Plastic Film and Sheeting Using a Modulated Infrared Sensor," ASTM, Designation: F1249-20, Jul. 2020, 4 pages.

"Introduction of MOCON Water Vapor Permeability Measuring Device, PERMTRAN-W 3/34G and Oxygen Permeability Measuring Device OX-TRAN 2/22L," Scientific Instrument News, vol. 59, No. 2, Sep. 2016, 5 pages (with partial English language translation).

"Technical Note, Measurement of Water Vapor Permeability by using AQUATRAN," Mitsui Chemical Analysis & Consulting Service, Inc., Retrieved on Nov. 29, 2021, 2 pages (with partial English language translation).

* cited by examiner

METHOD FOR MANUFACTURING FILM, FILM, LAMINATED BODY, AND PACKAGING MATERIAL

TECHNICAL FIELD

The present invention relates to a process for producing a film, a film, a laminate, and a packaging material.

BACKGROUND ART

A polychlorotetrafluoroethylene (hereinafter sometimes referred to as "PCTFE") film is used for e.g. packaging of pharmaceutical preparations by virtue of its excellent water vapor barrier property. For example, on a laminate having a layer consisting of a PCTFE film and other layer laminated, a pocket portion to accommodate a capsule or the like is provided by drawing to form a base material for blister packaging.

In recent years, as improvement of long term storage stability of pharmaceutical preparations and thickness reduction of films used are required, PCTFE films are required to have further improved water vapor barrier property.

As a method of improving the water vapor barrier property of the PCTFE films, the following methods have been proposed.

Molten PCTFE is extruded and cooled to a temperature of less than the melting point to form a crystalline PCTFE film, which is oriented under the predetermined conditions (Patent Document 1).

A process comprising a step of melting and forming PCTFE into a film, a step of holding the formed film at from 100 to 170° C., and a step of cooling the film after held to room temperature, wherein the temperature of the film is not lowered to 170° C. or below until the step of holding the formed film at from 100 to 170° C. (Patent Document 2).

PRIOR ART DOCUMENTS

Patent Documents

Patent Document 1: JP-A-2007-508962
Patent Document 2: JP-A-2015-98168

DISCLOSURE OF INVENTION

Technical Problem

However, by the method in Patent Document 1, the PCTFE film is hardened by orientation and its tensile elongations tend to decrease. Patent Document 2 discloses in Comparative Example 3 that an oriented PCTFE film has a tensile elongation in MD of 9% and a tensile elongation in TD of 10%. In a case where a PCTFE film has low tensile elongations, when the PCTFE film or a laminate comprising it is subjected to drawing, the PCTFE film will be broken (inferior in drawing processability).

By the process in Patent Document 2, the water vapor barrier property will be improved by an increased degree of crystallization of the PCTFE film. However, if the degree of crystallization becomes high, the haze of the PCTFE film will be high (the transparency tends to be low). If the PCTFE film has low transparency, visibility of the content packaged in the PCTFE film or a laminate comprising it tends to decrease.

The object of the present invention is to provide a process for producing a film excellent in water vapor barrier property, tensile elongations and transparency.

Another object of the present invention is to provide a film excellent in water vapor barrier property, drawing processability and transparency and useful as a packaging material, and a laminate and a packaging material using it.

Solution to Problem

The present invention provides a process for producing a film, a film, a laminate and a packaging material, having the following constructions [1] to [13].

[1] A process for producing a film, which comprises:
melting a resin material containing polychlorotrifluoroethylene and extruding it into a film from an extrusion die, bringing the extruded product into contact with a cooling roll having a surface temperature of at most 120° C. in a state such that the surface temperature of the extruded product is higher than the crystallization temperature of the polychlorotrifluoroethylene to form a film web, and
subjecting the film web to heat treatment at from 80 to 200° C.

[2] The process for producing a film according to [1], wherein the film web has a haze per thickness 100 μm of at most 3%.

[3] The process for producing a film according to [1] or [2], wherein the film web has tensile elongations in MD and in TD at 23° C. of respectively at least 30%.

[4] The process for producing a film according to any one of [1] to [3], wherein the heat treatment is carried out so that the density of the film after the heat treatment is from 100.2 to 102.5% of the density of the film web.

[5] The process for producing a film according to any one of [1] to [4], wherein the density of the film web is at most 2.120 g/cm$^3$.

[6] The process for producing a film according to [5], wherein the heat treatment is carried out so that the density of the film is at least 2.125 g/cm$^3$.

[7] The process for producing a film according to any one of [1] to [6], wherein the heat treatment is applied to the film web wound into a roll.

[8] The process for producing a film according to any one of [1] to [6], wherein the heat treatment is applied while the film web wound into a roll is unwound and conveyed, or while the film web is conveyed without being wound.

[9] A film, which comprises polychlorotrifluoroethylene,
has a water vapor transmission rate of at most 0.07 g/(m$^2$·day) per thickness 100 μm at 37.8° C. under a relative humidity of 100%,
has a haze per thickness 100 μm of at most 3%, and
has tensile elongations in MD and in TD at 23° C. of respectively at least 30%.

[10] The film according to [9], which has a density of at least 2.125 g/cm$^3$.

[11] A laminate, comprising a layer consisting of the film as defined in [9] or [10], and at least one other layer.

[12] A packaging material comprising the film as defined in [9] or [10] or the laminate as defined in [11].

[13] The packaging material according to [12], for blister packaging.

Advantageous Effects of Invention

According to the process for producing a film of the present invention, it is possible to produce a film excellent in water vapor barrier property, tensile elongations and transparency.

The film of the present invention is excellent in water vapor barrier property, tensile elongations and transparency. According to the film of the present invention, it is possible to provide a laminate and a packaging material excellent in water vapor barrier property, tensile elongation and transparency.

DESCRIPTION OF EMBODIMENTS

Figure 1:
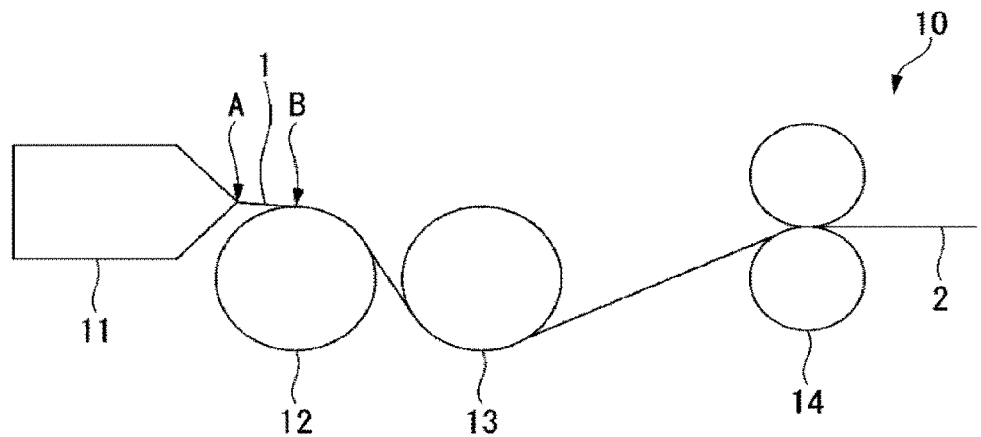
FIG. 1 is a view schematically illustrating an apparatus for producing a film web.

Meanings of the following terms in this specification are as follows.

A "film web" is a film before post-processing (processing after film formation) such as heat treatment is applied. The film web may be a continuous (strip) film or may be a sheet film.

"MD" means a machine direction, and "TD" means a transverse direction at right angles to MD.

The "melting point" means a temperature corresponding to the maximum value of a melting peak of a polymer measured by differential scanning calorimetry (DSC).

The "crystallization temperature" is a temperature corresponding to the maximum value of an exothermic peak which appears when a molten polymer is cooled at a rate of 10° C./min, by DSC.

The "melt volume flow rate" (MVR) of PCTFE is a value (mm$^3$/sec) measured in accordance with the method specified in JIS K7210-1:2014 (corresponding international standard ISO 1133-1:2011), at 230° C. under a pressure of 100 kg/cm$^2$ using an orifice having a length of 1 mm and an inner diameter of 1 mm.

The "surface temperature of an extruded product" is a value obtained by radiation temperature measurement. Specifically, it is a temperature measured by an infrared radiation thermometer at an emissivity of 0.85 at an angle of 30° to the surface of an object to be measured at a position about 20 cm apart from the surface. In the present invention, the surface temperature of an extruded product is a measured value at the center in TD that is in the film width direction.

The "surface temperature of a cooling roll" is a value measured by a contact type surface thermometer.

The "water vapor transmission rate per thickness 100 μm" of the film web or the film (hereinafter they may sometimes be generally referred to as "film or the like" is the water vapor transmission rate of the film or the like when the film or the like has a thickness of 100 μm. When the thickness of the film or the like is not 100 μm, it is a value calculated in accordance with the following formula 1.

Water vapor transmission rate per 100 μm thickness=water vapor transmission rate of the film or the like×(thickness of the film or the like/100 μm))  formula 1.

The "thickness" of the film or the like is a value measured by a contact type thickness meter.

The "water vapor transmission rate" (hereinafter sometimes referred to as "WVTR") of the film or the like is a value measured in accordance with the method specified in JIS K7129:2008 Appendix B (infrared detection sensor method).

The "haze per thickness 100 μm" of the film or the like is the haze of film or the like when the film or the like has a thickness of 100 μm. When the thickness of the film or the like is not 100 μm, it is a value calculated in accordance with the following formula 2.

Haze per thickness 100 μm=haze of the film or the like×(100/thickness of the film or the like (μm))  formula 2

The "haze" is a value measured in accordance with the method specified in JIS K7136:2000 (corresponding international standard: ISO 14782:1999) using CIE standard colorimetric illuminant D65 in accordance with JIS Z8781-2:2012 (corresponding international standard ISO 11664-2:2007) at 23° C.

The "tensile elongation" is a value measured in accordance with ASTM D638 with respect to an ASTM V dumbbell test specimen at a pulling rate of 200 mm/min at 23° C.

The "density" is a value measured in accordance with the method A (water replacement method) specified in JIS K7112:1999.

The dimensional ratios in FIGS. 1 to 5 are different from actual ones for the convenience of explanation.

[Process for Producing Film]

In the process for producing a film of the present invention, first, a film web is formed from a resin material containing PCTFE (forming step). The, heat treatment is applied to the film web (heat treatment step).

The resin material may further contain, as the case requires, additives, etc. The resin material will be described in detail later.

(Forming Step)

In the forming step, the resin material containing PCTFE is melted and extruded into a film from an extrusion die, and the extruded product is brought into contact with a cooling roll having a surface temperature of at most 120° C. in a state such that the surface temperature of the extruded product is higher than the crystallization temperature of PCTFE, to form a film web.

The extruded product having been brought into contact with the cooling roll may further be brought into contact with other cooling roll. The surface temperature of other cooling roll is also adjusted to at most 120° C.

Hereinafter, a cooling roll with which the extruded product from the extrusion die is brought into contact i-th time (i is an integer of at least 1) will sometimes be referred to as "i-th cooling roll". For example, the cooling roll with which the extruded product from the extrusion die is brought into contact first time will sometimes be referred to as the first roll.

An example of the method for forming the film web will be described with reference to FIG. 1.

FIG. 1 is a view schematically illustrating an apparatus 10 for producing a film web.

The production apparatus 10 comprises an extruder (not shown), an extrusion die 11 attached to the extruder, a first cooling roll 12 having a surface temperature of at most 120° C., a subsequently disposed second cooling roll 13 and a subsequently disposed pair of nip rolls 14.

The first cooling roll 12 and the second cooling roll 13 are disposed in series so that an extruded product 1 (molten resin material) extruded from the extrusion die 11 sequentially passes through the first cooling roll 12 and the second cooling roll 13 toward the pair of nip rolls 14.

As the extruder, a known extruder such as a single screw extruder or a twin screw extruder may be used.

As the extrusion die 11, a known extrusion die such as a T die (flat die) may be used.

As the first cooling roll 12 and the second cooling roll 13, ones capable of controlling the surface temperature may be used, and known cooling rolls can be used.

An example in which the production apparatus 10 comprises two cooling rolls 12 and 13 is shown, however, the number of the cooling rolls which the production apparatus 10 has is not limited to two, and may be one or may be three or more.

The production apparatus 10 may further has a wind-up roll subsequent to the pair of nip rolls 14.

A pushing roll may be disposed so as to face the first cooling roll so that the pushing roll can press the extruded product to the first cooling roll when the extruded product and the first cooling roll are brought into contact with each other.

In the production apparatus 10, the film web is formed as follows.

The resin material containing PCTFE is melted by the extruder (not shown), and the resulting resin material melt is supplied to the extrusion die 11 and extruded into a film from the extrusion die 11. Then, the extruded product 1 extruded from the extrusion die 11 is conveyed so that it is sequentially brought into contact with the first cooling roll 12 and the second cooling roll 13 and passes between the pair of nip rolls 14.

The extruded product 1 is cooled by being brought into contact with the cooling rolls 12 and 13 and its film shape is fixed, whereby a continuous film web 2 is obtained. The extruded product 1 is typically conveyed so that one surface and the other surface of the extruded product 1 are alternately in contact with the plurality of the cooling rolls 12 and 13.

As the case requires, the film web 2 may be wound on a wind-up roll and formed into a roll, or the film web 2 may be cut into sheets.

The temperature in the extruder (the temperature at which the resin material is melted) and the temperature of the extrusion die 11 are temperatures at which PCTFE is melted. The temperatures are typically the melting temperature of PCTFE or higher, respectively, and are preferably the melting temperature of PCTFE+(40° C. to 130° C.).

When the temperature in the extruder and the temperature of the extrusion die 11 are at least the above lower limit value, the melt can stably be extruded, and when they are at most the above upper limit value, deterioration of the material accompanying heat decomposition can be suppressed.

The extruded product 1 is brought into contact with the first cooling roll 12 in a state such that the surface temperature of the extruded product 1 is higher than the crystallization temperature of PCTFE. Further, the surface temperature of the first cooling roll 12 is at most 120° C.

By such adjustment, the extruded product 1 is quenched when brought into contact with the first cooling roll 12, whereby the degree of crystallization of the film web 2 becomes low. Since the degree of crystallization of the film web 2 is low, the haze of the film web 2 is low. Further, since the degree of crystallization of the film web 2 is low and there is a great part of amorphous portion, the tensile elongations at 23° C. tend to be high. Such low haze and high tensile elongation are sufficiently maintained even after the heat treatment.

The surface temperature (hereinafter sometimes referred to as "$T_1$") of the extruded product 1 when brought into contact with the first cooling roll 12 and the surface temperature (hereinafter sometimes referred to "To") of the first cooling roll 12 are set depending upon the desired degree of crystallization of the film web 2 and thus the desired haze, tensile elongations, etc. of the film web 2.

$T_{r1}$ is at most 120° C. with a view to lowering the degree of crystallization of the film web 2. $T_{r1}$ is preferably at most 100° C., more preferably at most 80° C. The lower limit of $T_{r1}$ is, for example, 20° C.

$T_1$ is, with a view to lowering the degree of crystallization of the film web 2, higher than the crystallization temperature of PCTFE. $T_1$ is preferably at least (the crystallization temperature of PCTFE+10° C.), particularly preferably at least (the crystallization temperature of PCTFE+30° C.). The upper limit of $T_1$ is, for example, (the melting point of PCTFE+110° C.).

The difference ($T_1-T_{r1}$) between $T_1$ and $T_{r1}$ is, with a view to lowering the degree of crystallization of the film web 2, preferably at least 100° C., particularly preferably at least 140° C. The upper limit of $T_1-T_{r1}$ is, for example, 300° C.

$T_1$ may be adjusted in accordance with e.g. the temperature of the extrusion die 11, the distance from the outlet A of the extrusion die 11 to the contact point B where the extruded product 1 and the first cooling roll 12 are in contact with each other for the first time (hereinafter sometimes referred to as "A-B distance") and the forming rate (extrusion rate).

The forming rate is preferably from 1 to 50 m/min, particularly preferably from 2 to 40 m/min. When the forming rate is at least the above lower limit value, transparency and productivity will be good. When the forming rate is at most the above upper limit value, heat deterioration by shear heating accompanying an increase of the amount of the extruded product 1 can be suppressed.

The A-B distance is preferably at most 400 nm, particularly preferably at most 250 mm. When the A-B distance is at most the above upper limit value, $T_1$ can easily be made higher than the crystallization temperature of PCTFE. The lower limit of the A-B distance is, for example, 20 mm.

The surface temperature (hereinafter sometimes referred to as "$T_{r2}$") of the second cooling roll 13 is at most 120° C. $T_{r2}$ may be the same as or different from $T_{r1}$.

$T_{r2}$ is typically lower than $T_{r1}$. The lower limit of $T_{r2}$ is, for example, 20° C.

(Original Film)

The thickness of the film web 2 is, for example, from 6 to 500 μm, and may be properly selected considering the thickness of the film to be produced.

The haze of the film web 2 per thickness 100 μm is preferably at most 3%, particularly preferably at most 2%. When the haze of the film web 2 per thickness 100 μm is at most the above upper limit value, the degree of crystallization is low, the haze per thickness 100 μm of the film obtained by subjecting the film web 2 to heat treatment can readily be made to be at most 3%.

The lower limit of the haze of the film web 2 per thickness 100 μm is, for example, 0.1%.

The tensile elongations of the film web 2 in MD and in TD at 23° C. are respectively preferably at least 30%, particularly preferably at least 70%. When the tensile elongations are at least 30%, the tensile elongations of the film obtained by subjecting the film web 2 to heat treatment in MD and in TD at 23° C. are excellent.

The upper limit of each of the tensile elongations of the film web 2 in MD and TD at 23° C. is, for example, 350%.

To increase the tensile elongations of the film web 2, the above method of lowering the degree of crystallization of the film web 2 by adjusting the $T_1$ and $T_{r1}$ as described above, a method of installing a far infrared heater between the extrusion die and the cooling roll to heat the extruded product, or the like may be mentioned.

The density of the film web 2 is preferably at most 2.120 g/cm³, particularly preferably at most 2.118 g/cm³. When the density of the film web 2 is at most 2.120 g/cm³, the degree of crystallization of the film web 2 is sufficiently low, and the haze per thickness 100 μm and the tensile elongations in MD and in TD are likely to be within the above preferred ranges.

The lower limit of the density of the film web 2 is, for example, 2.110 g/cm³.

(Heat Treatment Step)

In the heat treatment step, the film web is subjected to heat treatment.

As a heat treatment method, the following methods I, II and III may, for example, be mentioned.

Method I: a method of applying the heat treatment to the film web wound into a roll.

Method II: a method of applying the heat treatment while the film web wound into a roll is unwound and conveyed, or while the film web is conveyed without being wound.

Method III: a method of cutting the film web into sheets, and applying the heat treatment to the film web in the form of sheets.

In the method I, for example, the wind-up roll is disposed subsequent to the pair of nip rolls 14 in the above production apparatus 10, the film web 2 having been passed between the pair of nip rolls 14 is wound on the wind-up roll, and the wound film web 2 is accommodated in a heat treatment apparatus and is subjected to heat treatment.

Figure 2:
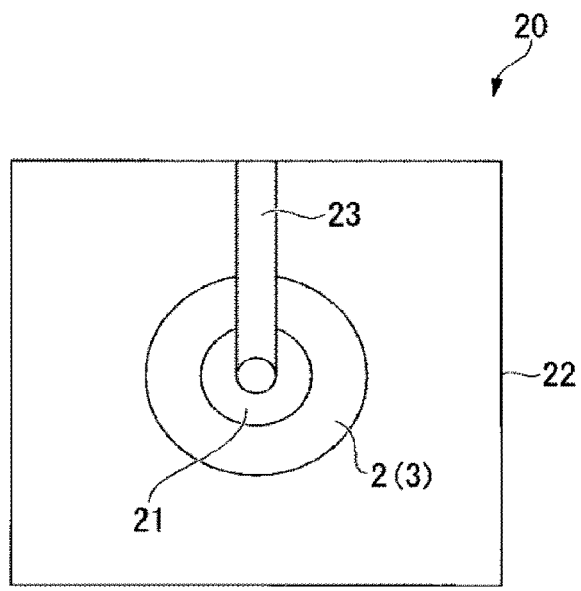
FIG. 2 is a view schematically illustrating an example of a heat treatment apparatus.

FIG. 2 schematically illustrates a structure of an example of a heat treatment apparatus used in the method I.

A heat treatment apparatus 20 shown in FIG. 2 comprises a constant temperature bath 22 in which the film web 2 wound into a roll on the wind-up roll 21 is accommodated, a pair of hangers 23 extending downward from the ceiling of the constant temperature bath 22, holding the ends of the wind-up roll 21 at the tips, and a hot air circulating portion (not shown) circulating hot air in the constant temperature bath 22.

The heat treatment using the heat treatment apparatus 20 is carried out, for example, by the following procedure.

The film web 2 wound into a roll on the wind-up roll 21 is accommodated in the constant temperature bath 22 of the heat treatment apparatus 20, and both ends of the wind-up roll 21 are held by the pair of hangers 23 to hang the film web 2. Then, hot air is circulated by the hot air circulating portion into the constant temperature bath 22 to apply heat treatment to the film web 2, thereby to obtain a film 3 which is a heat-treated film web 2.

In the method I, the heat treatment means is not limited to hot air and may be steam, warm water, a heating medium, infrared heating or the like. Instead of the constant temperature bath, a pressurized steam container, a warm water bath, a heating medium bath, an infrared heating furnace or the like may be used.

In the method II, for example, a wind-up roll is disposed subsequent to the pair of nip rolls 14 of the above production apparatus 10, and the film web having been passed between the pair of nip rolls 14 is wound on the wind-up roll, and the wound film web 2 is unwound and introduced to the heat treatment apparatus and subjected to heat treatment while being conveyed in MD by roll-to-roll process.

Figure 3:
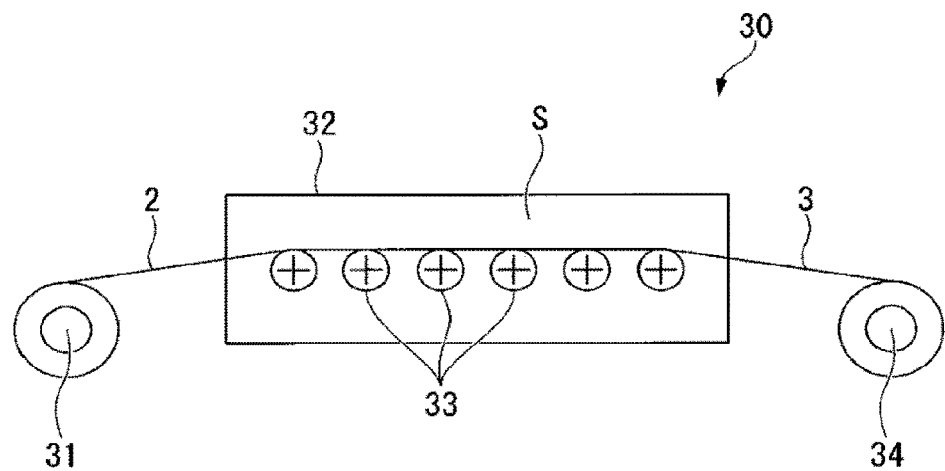
FIG. 3 is a view schematically illustrating another example of a heat treatment apparatus.

FIG. 3 schematically illustrates a structure of an example of a heat treatment apparatus used in the method II.

A heat treatment apparatus 30 shown in FIG. 3 comprises an unwinding roll 31 sequentially unwinding the film web 2 wound into a roll, a heat treatment portion 32 to apply the heat treatment to the film web 2, a plurality of conveying rolls 33, and a wind-up roll 34 on which a film 3 which is the heat-treated film web 2 is wound. In the heat treatment portion 32, a space S into which the film web 2 is conveyed is formed, and the plurality of conveying rolls 33 are disposed in the space S. Further, in the heat treatment portion 32, a heating mechanism (not shown) to heat the film web 2 introduced into the space S is provided.

The heat treatment using the heat treatment apparatus 30 is conducted, for example, by the following procedure.

The film web 2 wound into a roll is transferred to the unwinding roll 31 in the heat treatment apparatus 30, unwound from the unwinding roll 31 and conveyed to the heat treatment portion 32, and heat-treated by the heating mechanism to form the film web 2 into the film 3, and the film 3 is wound on the wind-up roll 34.

Instead of the heat treatment as above, the heat treatment apparatus may be disposed subsequent to the production apparatus 10 so that the film web 2 having been passed between the pair of nip rolls 14 is introduced to the heat treatment apparatus as it is without being wound and is subjected to heat treatment while being conveyed in MD by roll-to-roll process.

The film web 2 may be conveyed on a conveyer instead of being conveyed by roll-to-roll process.

After the heat treatment, as the case requires, the heat-treated film web may be wound into a roll on the wind-up roll, or may be cut into sheets.

In the method III, the film in the form of sheets may be subjected to heat treatment on a fixed table, or may be subjected to heat treatment while conveyed on a conveyer.

In a case where the film web is subjected to the heat treatment while being conveyed (for example in a case where the heat treatment is conducted by the method II), the tension applied to the film web at the time of the heat treatment is preferably at most 100 N/m. The tension may be 0 N/m. When the tension is at most the above upper limit value, the film web is oriented at the time of the heat treatment and becomes hard, and a decrease of tensile elongations in MD and in TD can be suppressed. The tension may be indirectly or directly obtained as calculated as braking torque or by a tension meter disposed on the roll in the middle.

The heat treatment temperature for the film web is from 80 to 200° C.

When the heat treatment temperature is at least 80° C., the film web has an increased density and thereby can hardly transmit water vapor, thus lowing WVTR. Further, since the temperature is at most the crystallization temperature, the haze of the heat-treated film web is substantially equal to that of the film web.

On the other hand, if the density is too high, the film web tends to be hard, and the tensile elongations in MD and in TD decrease. When the heat treatment temperature is at most 200° C., the tensile elongations of the film web in MD and in TD can sufficiently be maintained.

Accordingly, when the heat treatment temperature is from 80 to 200° C., a film excellent in water vapor barrier property, transparency and tensile elongations can be obtained.

The reason why the density of the film web is increased by the heat treatment is considered to be such that molecules arranged partly sparsely e.g. by the process stress at the time of forming the film web are compacted by the heat treatment.

In a case where the film web is subjected to heat treatment without being conveyed (for example, in a case where the heat treatment is conducted by the method I), the heat treatment temperature is preferably from 80 to 200° C., particularly preferably from 100 to 180° C. The heat treatment time is preferably from 0.5 to 168 hours, more preferably from 2 to 48 hours.

In a case where the film web is subjected to heat treatment while being conveyed (for example, in a case where the heat treatment is conducted by the method I), the heat treatment temperature is preferably from 90 to 200° C., particularly preferably from 120 to 200° C. The heat treatment time is preferably from 5 to 1,800 seconds, more preferably from 10 to 600 seconds.

The heat treatment on the film web obtained in the forming step is preferably carried out so that the density of the film after the heat treatment is from 100.2 to 102.5% of the density (100%) of the film web. The density of the film is more preferably from 100.5 to 102.2%, particularly preferably from 100.9 to 102.0 of the density of the film web. When the density of the film is within such a range, decreases of WVTR and the tensile elongations can be within the desired ranges.

Further, in a case where the density of the film web obtained in the forming step is at most 2.120 g·cm³, the heat treatment is carried out preferably so that the density of the film web after the heat treatment and thus the density of the finally obtainable film is at least 2.125 g/cm³. When the film has a density of at least 2.125 g/cm³, the film will be more excellent in water vapor barrier property and transparency.

When the density of the film web is at most 2.120 g/cm³, the upper limit of the density of the film web after the heat treatment is, for example, 2.173 g/cm³.

The density of the film can be adjusted by the density of the film web, the heat treatment temperature and the heat treatment time. The higher the heat treatment temperature is, or the longer the heat treatment time is, the higher the density of the film tends to be.

To the film obtained after the heat treatment to the film web, post-processing other than the heat treatment (hereinafter sometimes referred to as "other post-processing") may be applied to obtain a final product.

As other post-processing, cutting of the film, an orientation treatment, a surface treatment, printing or coating may, for example, be mentioned.

If orientation treatment is conducted, the tensile elongation in MD and the tensile elongation in TD of the film tend to decrease, and accordingly it is preferred not to conduct the orientation treatment. In a case where the orientation treatment is conducted, the orientation treatment conditions are preferably such that the tensile elongations of the film in MD and in TD at 23° C. after the orientation treatment will not be less than 30%.

(Resin Material)

The resin material contains PCTFE.

PCTFE in the present invention is a polymer containing units based on chlorotrifluoroethylene (hereinafter sometimes referred to as "CTFE") (hereinafter sometimes referred to as "CTFE units").

PCTFE may contain units based on a monomer copolymerizable with CTFE. PCTFE may contain one type or two or more types of units based on other monomer.

Other monomer may, for example, be a fluoromonomer other than CTFE or a monomer having no fluorine atom (hereinafter sometimes referred to as "non-fluorinated monomer").

The fluoromonomer other than CTFE may, for example, be a fluoroolefin such as vinyl fluoride, vinylidene fluoride, trifluoroethylene, tetrafluoroethylene, hexafluoropropylene or hexafuoroisobutylene, a perfluoro(alkyl vinyl ether), fluorovinyl ether having a functional group, fluoro(divinyl ether), polyfluoro(alkyl ethylene) or a fluoromonomer having a cyclic structure.

The perfluoro(alkyl vinyl ether) may, for example, be $CF_2=CFOCF_3$, $CF_2=CFOCF_2CF_3$, $CF_2=CFOCF_2CF_2CF_3$, $CF_2=CFOCF_2CF_2CF_2CF_3$ or $CF_2=CFO(CF_2)_6F$.

The polyfluoro(alkyl ethylene) may, for example, be $CH_2=CF(CF_2)_2F$, $CH_2=CF(CF_2)_3F$, $CH_2=CF(CF_2)_4F$, $CH_2=CF(CF_2)_5F$, $CH_2=CF(CF_2)_6F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)H$, $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_6F$, $CH_2=CH(CF_2)_2H$, $CH_2=CH(CF_2)_3H$, $CH_2=CH(CF_2)_4H$, $CH_2=CH(CF_2)_5H$ or $CH_2=CH(CF_2)_6H$.

The fluorovinyl ether having a functional group may, for example, be $CF_2=CFOCF_2CF(CF_3)OCF_2CF_2SO_2F$, $CF_2=CFOCF_2CF_2SO_2F$, $CF_2=CFOCF_2CF(CF_3)OCF_2CF_2SO_3H$, $CF_2=CFOCF_2CF_2SO_3H$, $CF_2=CFO(CF_2)_3COOCH_3$ or $CF_2=CFO(CF_2)_3COOH$.

The fluoro(divinyl ether) may, for example, be $CF_2=CFCF_2CF_2OCF=CF_2$, $CF_2=CFCF_2OCF=CF_2$, $CF_2=CFO(CF_2)_3OCF=CF_2$, $CF_2=CFO(CF_2)_4OCF=CF_2$ or $CF_2=CFO(CF_2)_6OCF=CF_2$.

The fluoromonomer having a cyclic structure may, for example, be perfluoro(2,2-dimethyl-1,3-dioxole), 2,2,4-trifluoro-5-trifluoromethoxy-1,3-dioxole or perfluoro(2-methylene-4-methyl-1,3-dioxolane).

The non-fluorinated monomer may, for example, be a monomer having at least one type of functional group selected from the group consisting of a carbonyl group-containing group, a hydroxy group, an epoxy group, an amide group, an amino group and an isocyanate group and containing no fluorine atom (hereinafter sometimes referred to as "functional monomer"), an olefin (such as ethylene) or a vinyl ester (such as vinyl acetate).

The functional group of the functional monomer is preferably a carbonyl group-containing group in view of adhesion at an interface with other layer. The carbonyl group-containing group may, for example, be a keto group, a carbonate group, a carboxy group, a haloformyl group, an alkoxycarbonyl group or an acid anhydride group.

The keto group is preferably contained between carbon atoms of a $C_{2-8}$ alkylene group. The number of carbon atoms of the alkylene group is the number of carbon groups not including carbon atoms of the keto group. The alkenylene group may be linear or branched.

The haloformyl group may, for example, be —C(=O)F, —C(=O)Cl, —C(=O)Br or —C(=O)I, and is preferably —C(=O)F.

The alkoxy group in the alkoxycarbonyl group is preferably a $C_{1-8}$ alkoxy group, particularly preferably a methoxy group or an ethoxy group.

The carbonyl group-containing group is preferably an acid anhydride group or a carboxy group.

The functional monomer is preferably a monomer having a carboxy group such as maleic acid, itaconic acid, citraconic acid or undecylenic acid, a monomer having an acid anhydride group such as itaconic anhydride (hereinafter sometimes referred to as "IAH"), citraconic anhydride (hereinafter sometimes referred to as "CAH"), 5-norbornene-2,3-dicarboxylic anhydride (hereinafter sometimes referred to as "NAH") or maleic anhydride, a hydroxyalkyl vinyl ether or an epoxyalkyl vinyl ether, and is preferably a monomer having a carboxy group or a monomer having an acid anhydride group.

The monomer having an acid anhydride group is preferably IAH, CAH or NAH.

The functional monomer may be used alone or in combination of two or more.

PCTFE may have a functional group as the terminal group of the polymer main chain.

PCTFE having a functional group as the terminal group of the polymer main chain is obtained by polymerization using a chain transfer agent or a polymerization initiator which brings about the functional group.

The chain transfer agent which brings about the functional group may, for example, be acetic acid, acetic anhydride, methyl acetate, ethylene glycol or propylene glycol.

The polymerization initiator which brings about the functional group may, for example, be di-n-propyl peroxydicarbonate, diisopropyl peroxycarbonate, tert-butyl peroxyisopropylcarbonate, bis(4-tert-butylcyclohexyl) peroxydicarbonate or di-2-ethylhexyl peroxydicarbonate.

The proportion of the CTFE units to the total of all units constituting PCTFE is preferably from 90 to 100 mol %, more preferably from 95 to 100 mol %, particularly preferably from 97 to 100 mol %, most preferably 100 mol % (that is PCTFE is a CTFE homopolymer). When the proportion of the CTFE units is at least the above lower limit value, the resulting film will be more excellent in water vapor barrier property.

MVR of PCTFE is preferably from 1 to 400 mm$^3$/sec, more preferably from 5 to 350 mm$^3$/sec, particularly preferably from 10 to 300 mm$^3$/sec. When MVR is at least the above lower limit value, excellent forming property will be obtained, and a film excellent in surface smoothness and outer appearance tends to be obtained. When MVR is at most the above upper limit value, a film excellent in mechanical strength is likely to be obtained.

The melting point of PCTFE is preferably from 200 to 225° C., particularly preferably from 205 to 220° C. When the melting point of PCTFE is at least the above lower limit value, the resulting film will be excellent in heat resistance. When the melting point of PCTFE is at most the above upper limit value, the film web will easily be formed.

The resin material may further contain, within a range not to impair the effects of the present invention, as the case requires, e.g. additives.

The additives may, for example, be a dye such as an organic pigment and an inorganic pigment, a heat stabilizer such as copper oxide, and an antistatic agent such as an ionic liquid.

The proportion of PCTFE to the total mass of the resin material is preferably from 97 to 100 mass %, more preferably from 99 to 100 mass %, further preferably from 99.5 to 100 mass %, particularly preferably from 99.7 to 100 mass %. When the proportion of PCTFE is at least the above lower limit value, the resulting film will be more excellent in water vapor barrier properties.

(Function and Effects)

In the process for producing the film of the present invention, the resin material containing PCTFE is melted and extruded into a film from an extrusion die, the extruded product is brought into contact with a cooling roll having a surface temperature of at most 120° C. in a state such that the surface temperature of the extruded product is higher than the crystallization temperature of the polychlorotrifluoroethylene to form a film web, which is subjected to heat treatment at from 80 to 200° C. Accordingly, the degree of crystallization can properly be controlled. It is considered that the resulting film is thereby excellent in water vapor barrier property, tensile elongations and transparency.

[Film]

The film of the present invention comprises PCTFE.

PCTFE is as described above.

The film of the present invention may further contain, within a range not to impair the effects of the present invention, as the case requires, e.g. additives. The additives are as described above.

The proportion of PCTFE to the total mass of the film is preferably from 97 to 100 mass %, more preferably from 99 to 100 mass %, further preferably from 99.5 to 100 mass %, particularly preferably from 99.7 to 100 mass %. When the proportion of PCTFE is at least the above lower limit value, the resulting film will be more excellent in water vapor barrier property.

The thickness of the film of the present invention is, for example, from 6 to 500 μm, and may be properly selected considering e.g. application of the film and the desired WVTR.

For example, in a case where a layer consisting of the film of the present invention is laminated with other layer to form a laminate, and the laminate is used for blister packaging, the thickness of the layer consisting of the film is preferably from 6 to 100 μm.

WVTR of the film of the present invention per thickness 100 μm at 37.8° C. under a relative humidity of 100% is at most 0.07 g/(m$^2$·day), preferably at most 0.06 g/(m$^2$·day), particularly preferably at most 0.05 g/(m$^2$·day). The lower the above WVTR, the more excellent the water vapor barrier property.

The above WVTR is preferably as low as possible in view of water vapor barrier property, however, if WVTR becomes low, the tensile elongations tend to be small. Accordingly, WVTR under a relative humidity of 100% is preferably at least 0.02 g/(m$^2$·day), more preferably at least 0.03 g/(m$^2$·day).

Further, in view of balance between water vapor barrier property and tensile elongations, WVTR is preferably from 0.02 to 0.07 g/(m$^2$·day), particularly preferably from 0.03 to 0.06 g/(m$^2$·day).

The haze of the film of the present invention per thickness 100 μm is at most 3%, preferably at most 2%, particularly preferably at most 1%, most preferably at most 0.5%. The lower the haze, the more excellent the transparency.

The tensile elongations of the film of the present invention in MD and in TD at 23° C. are respectively at least 30%, preferably at least 50%, particularly preferably at least 70%. When the tensile elongations are at least 30%, the film of the present invention or a laminate of the film of the present invention with other layer is less likely to be broken when subjected to drawing, and is excellent in drawing processability.

The upper limits of the tensile elongations of the film in MD and in TD are, for example, 350%.

The density of the film of the present invention is preferably at least 2.125 g/cm³, particularly preferably at least 2.135 g/cm³. When the density of the film is at least 2.125 g/cm³, the film will be excellent in water vapor barrier property.

The density of the film is preferably at most 2.165 g/cm³, particularly preferably at most 2.160 g/cm³. When the density of the film is at most 2.165 g/cm³, the tensile elongations of the film in MD and in TD will be excellent.

The film of the present invention can be produced by the above process for producing a film of the present invention.

[Laminate]

The laminate of the present invention is a laminate of a layer consisting of the film of the present invention and at least one other layer.

The laminate of the present invention may have one or more layers consisting of the film of the present invention and one or more other layers. The total number of layers constituting the laminate of the present invention is, for example, from 2 to 5.

Figure 4:
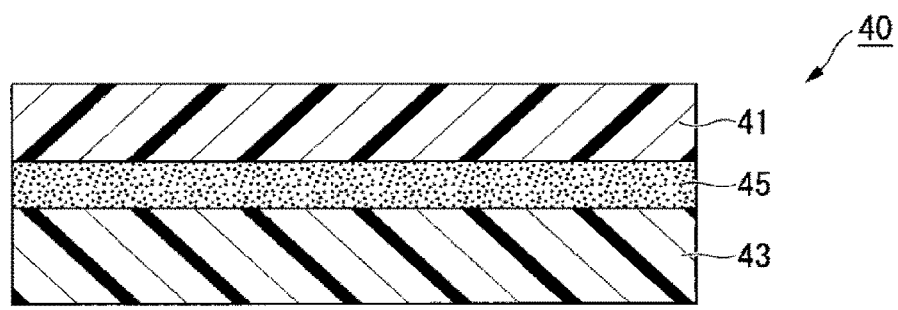
FIG. 4 is a cross sectional view schematically illustrating an example of a laminate of the present invention.

FIG. 4 is a cross sectional view schematically illustrating an example of the laminate of the present invention.

A laminate 40 shown in FIG. 4 is a laminate having a layer 41 consisting of the film of the present invention, an adhesive layer 45 (other layer) and a substrate layer 43 (other layer) laminated in this order.

The material constituting the substrate layer 43 may, for example, be polypropylene, polyvinyl chloride, polyvinylidene chloride, a cyclic olefin polymer or a non-oriented polyethylene terephthalate.

The thickness of the substrate layer 43 is, for example, from 100 to 1,000 μm.

The adhesive constituting the adhesive layer 45 may, for example, be a urethane adhesive or a polyester adhesive.

The thickness of the adhesive layer 45 is, for example, from 1 to 10 μm.

The laminate 40 may be produced, for example, by bonding a layer consisting of the film of the present invention and the substrate layer 43 by the adhesive.

The film of the present invention can be produced by the above process for producing a film of the present invention.

In order to improve the adhesion between the layer consisting of the film of the present invention and other layer, before other layer is laminated, the film of the present invention or the substrate layer 43 may be subjected to surface treatment. The surface treatment may, for example, be plasma treatment, corona treatment or ultraviolet treatment.

To bond the film of the present invention and the substrate layer 43, known lamination method such as dry lamination or wet lamination may be employed.

[Packaging Material]

The packaging material of the present invention comprises the film of the present invention or the laminate of the present invention.

The packaging material of the present invention is preferably a packaging material for blister packaging, since the film of the present invention is excellent in water vapor barrier property, transparency and tensile elongations.

Figure 5:
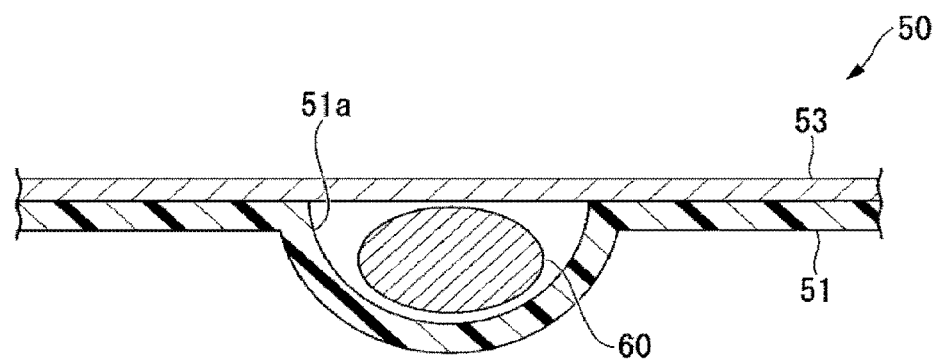
FIG. 5 is a cross sectional view schematically illustrating an example of blister packaging.

FIG. 5 is a cross sectional view schematically illustrating an example of a package in which a content is accommodated in blister packaging. FIG. 5 illustrates a state where a content is accommodated in the package. The content may, for example, be a chemical capsule.

A package 50 shown in FIG. 5 comprises a container 51 and a cover 53.

The container 51 has at least one pocket portion 51a. The pocket portion 51a has a concave portion which opens toward one side of the container 51. A content 60 is to be accommodated in the concave portion. The pocket portion 51a is formed to protrude toward the other side of the container 51.

The cover 53 is laminated on one side of the container 51 and seals the opening of the concave portion of the pocket portion 51a.

By subjecting the packaging material of the present invention, for example, the above laminate 40, is subjected to drawing by a known method to form the pocket portion 51a, the container 51 is obtained. In a case where the pocket portion 51a is formed on the laminate 40, usually, the pocket portion 51a is formed so that the layer 41 consisting of the film of the present invention faces the inside (the cover 53 side).

As the cover 53, one known as a cover material for blister packaging may be used. For example, a cover comprising a substrate consisting of e.g. an aluminum foil, and a heat seal layer laminated on one side (container 51 side) of the substrate may be used.

EXAMPLES

Now, the present invention will be described in further detail with reference to Examples. However, it should be understood that the present invention is by no means restricted to the following description.

Among the after-described Ex. 1 to 6, Ex. 1 to 4 are Examples of the present invention, and Ex. 5 and 6 are Comparative Examples.

Measurement and evaluation methods in Ex. and materials are shown below.

(Measurement Method)

<MVR>

MVR (mm³/sec) of PCTFE was measured in accordance with the method specified in JIS K7210-1: 2014 (corresponding international standard ISO 1133-1: 2011), under conditions at a temperature of 230° C. under a pressure of 100 kg/cm² at L/D=1/1 mm.

<Melting Point, Crystallization Temperature>

The melting point of PCTFE was measured by a differential scanning calorimeter (manufactured by Seiko Instruments Inc., DSC7020) at a heating rate of 10° C./min. The crystallization temperature of PCTFE was defined by the position of an exothermic peak measured by a differential scanning calorimeter (manufacture by Seiko Instruments Inc., DSC7020) at a cooling rate of 10° C./min with respect to once molten PCTFE.

Specifically, in an aluminum pan, 10±0.2 mg of a sample was weighed, and the aluminum pan was tightly stopped with an aluminum cap. 10±0.2 mg of alumina as a comparative material was weighed in the same manner, and the aluminum pan was tightly stopped with an aluminum cap. The sample and the comparative material were set to the differential scanning calorimeter, heated at 10° C./min from 30° C. to 270° C., held for 5 minutes and then cooled at a cooling rate of 10° C./min to 120° C. or lower. The temperature corresponding to the maximum value of the melting peak which appeared in the heating procedure in the obtained DSC curve was defined as the melting point. Further, the temperature corresponding to the aluminum pan exothermic peak temperature which appeared in the cooling procedure was defined as the crystallization temperature.

<Surface Temperature of Extruded Product and Cooling Roll>

The surface temperature of the extruded product was measured by an infrared radiation thermometer (manufactured by Sato Keiryo Mfg. Co., Ltd., SK-8900) at an emissivity of 0.85 at an angle of 30° to the surface of the extruded product at a position about 20 cm apart from the surface. In the present invention, the surface temperature of the extruded product is a measured value at the center in the film width direction. The surface temperature of the cooling roll was measured by a contact type surface thermometer (manufactured by Anritsu Meter Co., Ltd., HA-200E).

<Thickness>

The thickness of the film or the like is a value measured by a contact type thickness meter (micrometer manufactured by Mitutoyo Corporation).

<WVTR>

The water vapor transmission rate (WVTR) of the film or the like was measured in accordance with the method specified in JIS K7129:2008 Appendix B at 37.8° C. under 100% RH, using a water vapor transmission rate measuring apparatus (manufactured by MOCON Inc., PERMATRAN-W3/31).

<Haze>

The haze of the film or the like was measured by a haze meter (manufactured by NIPPON DENSHOKU INDUSTRIES CO., LTD., NDH-5000) in accordance with the method specified in JIS K7136: 2000 (corresponding international standard: ISO 14782: 1999) using CIE standard colorimetric illuminant D65 in accordance with JIS Z8781-2: 2012 (corresponding international standard ISO 11664-2: 2007) at 23° C.

<Tensile Elongation>

The tensile elongations of the film or the like were measured in accordance with ASTM D638 with respect to an ASTM V dumbbell test specimen at a pulling rate of 200 mm/min at 23° C.

<Density>

The density (g/cm$^3$) of the film or the like was measured by using an automatic density meter (manufactured by SHINKO DENSHI CO., LTD., DMA-220) in accordance with method A (water replacement method) specified in JIS K7112:1999.

Production Example 1: Preparation of PCTFE

A stainless steel polymerization vessel having an internal capacity of 2.5 L was evacuated of air, 1,000 g of deionized water as a solvent, 4.0 g of potassium persulfate as an initiator and 555 g of chlorotrifluoroethylene (CTFE) were charged, and the internal temperature was adjusted to 50° C. The pressure on that time was 1.17 MPaG. "G" in "MPaG" means the gage pressure.

Then, an aqueous sodium bisulfite solution (8.6 g of sodium bisulfite in 100 g of deionized water) was added to initiate the polymerization. Addition was conducted at a rate of 7.4 cc/hr over a period of 4 hours, 7 hours after initiation of addition, the mixture was cooled, unreacted CTFE was purged, and the polymer was taken out from the polymerization vessel, washed and dried to obtain 105 g of PCTFE.

MVR of the obtained PCTFE was 75 mm$^3$/sec, the melting point was 211° C., and the crystallization temperature was 186° C.

Ex. 1 to 4

Using a production apparatus having the same structure as that of the production apparatus 10 shown in FIG. 1, a film web was formed in the following procedure. As the extruder, a single screw extruder having a barrel diameter of 30 mm was used. As the extrusion die 11, a die for a film having an opening width of 250 mm was used.

PCTFE in Production Example 1 was melted by the extruder and extruded from the extrusion die 11 to form an extruded product in the form of a film, which was made to sequentially pass through the first cooling roll 12, the second cooling roll 13 and the nip rolls 14 to fix the film shape, thereby to obtain a film web having a thickness of 100 μm. The temperature of the extrusion die 11 was 300° C., the distance from the outlet of the extrusion die 11 to the first cooling roll 12 (A-B distance) was 45 mm, the surface temperature of the first cooling roll 12 was 90° C., the surface temperature of the second cooling roll 13 was 60° C., and the forming rate was 1.1 m/min.

Then, the obtained film web was hung in a hot air circulating constant temperature bath having the temperature set as identified in Table 1 and subjected to heat treatment for 18 hours to obtain a film.

The surface temperature $T_1$ of the extrude product when brought into contact with the first cooling roll 12, the surface temperature $T_{r1}$ or the first cooling roll 12, and physical properties (the density, the water vapor transmission rate, the haze and the tensile elongations) of the obtained film are shown in Table 1.

Ex. 5

A film was obtained in the same manner as in Ex. 1 except that the film web was not subjected to heat treatment. The physical properties of the film are shown in Table 1.

The physical properties of the film in Ex. 5 may be considered as the physical properties of the film web in Ex. 1 to 4.

Ex. 6

A film was obtained in the same manner as in Ex. 5 except that the surface temperature of the first cooling roll 12 was 148° C. The physical properties of the film are shown in Table 1.

TABLE 1

| | | | Heat treatment | | Film physical properties | | | |
| | | | | | | | | Tensile elongation |
| | $T_1$ °C. | $T_{r1}$ °C. | Temperature °C. | Time hr | Density g/cm$^3$ | WVTR (100 μm) g/(m$^2$ · day) | Haze % | (MD/TD) % |
|---|---|---|---|---|---|---|---|---|
| Ex. 1 | 241 | 90 | 120 | 18 | 2.134 | 0.035 | 0.41 | 150/228 |
| Ex. 2 | 241 | 90 | 140 | 18 | 2.140 | 0.029 | 0.38 | 129/205 |

TABLE 1-continued

| | $T_1$ °C. | $T_{r1}$ °C. | Heat treatment | | Film physical properties | | | Tensile elongation |
| | | | Temperature °C. | Time hr | Density g/cm³ | WVTR (100 μm) g/(m²·day) | Haze % | (MD/TD) % |
|---|---|---|---|---|---|---|---|---|
| Ex. 3 | 241 | 90 | 160 | 18 | 2.149 | 0.027 | 0.35 | 138/20 |
| Ex. 4 | 241 | 90 | 80 | 18 | 2.121 | 0.068 | 0.28 | 160/317 |
| Ex. 5 | 241 | 90 | Nil | Nil | 2.115 | 0.074 | 0.37 | 145/213 |
| Ex. 6 | 244 | 148 | Nil | Nil | 2.136 | 0.045 | 12.1 | 204/181 |

The following was confirmed from the results shown in Table 1.

By bringing the extruded product into contact with the first cooling roll having a surface temperature of at most 120° C. in a state such that the surface temperature $T_1$ of the extruded product is higher than the crystallization temperature of PCTFE, a film web having a low haze and large tensile elongations can be obtained. Since the film web has a low haze and large tensile elongations, the degree of crystallization is low.

By subjecting the film web to heat treatment at from 80 to 200° C., the density is increased and WVTR is decreased while the lower haze and sufficient tensile elongations are held.

INDUSTRIAL APPLICABILITY

The application of the film of the present invention and the laminate of the present invention is not limited, and they may be used, for example, for a packaging material, a flexible solar cell surface material, a surface material of a display device using organic EL, etc.

Since the film of the present invention is excellent in water vapor barrier property, transparency and tensile elongations, the film of the present invention and the laminate of the present invention are suitable as a packaging material.

This application is a continuation of PCT Application No. PCT/JP2019/031976, filed on Aug. 14, 2019, which is based upon and claims the benefit of priority from Japanese Patent Application No. 2018-157183 filed on Aug. 24, 2018. The contents of those applications are incorporated herein by reference in their entireties.

REFERENCE SYMBOLS

1: extruded product, 2: film web, 3: film, 10: apparatus for producing film web, 11: extrusion die, 12: first cooling roll, 13: second cooling roll, 14: nip roll, 20: heat treatment apparatus, 21: wind-up roll, 22: constant temperature bath, 23: hanger, 30: heat treatment apparatus, 31: unwinding roll, 32: heat treatment portion, 33: conveying roll, 34: wind-up roll, 40: laminate, 41 layer consisting of film of the present invention, 43: substrate layer, 45: adhesive layer, 50: package, 51: container, 51a: pocket portion, 53: cover, 60: content.

What is claimed is:

1. A process for producing a film, comprising:
melting a resin material containing polychlorotrifluoroethylene;
extruding the melted resin material into a film from an extrusion die;
bringing the extruded film into contact with a cooling roll having a surface temperature of at most 120° C. in a state that a surface temperature of the extruded film is higher than a crystallization temperature of the polychlorotrifluoroethylene to form a film web; and
subjecting the film web to heat treatment at from 80 to 200° C. to obtain the film.

2. The process according to claim 1, wherein the film web has a haze per thickness 100 μm of at most 3%.

3. The process according to claim 1, wherein the film web has tensile elongations in MD and in TD at 23° C. of respectively at least 30%.

4. The process according to claim 1, wherein the heat treatment is carried out such that a density of the film after the heat treatment is from 100.2 to 102.5% of a density of the film web.

5. The process according to claim 1, wherein a density of the film web is at most 2.120 g/cm³.

6. The process according to claim 5, wherein the heat treatment is carried out such that a density of the film is at least 2.125 g/cm³.

7. The process according to claim 1, wherein the heat treatment is applied to the film web wound into a roll.

8. The process according to claim 1, wherein the heat treatment is applied while the film web wound into a roll is unwound and conveyed, or while the film web is conveyed without being wound.

9. The process according to claim 1, wherein the film has a water vapor transmission rate of at most 0.07 g/(m²·day) per thickness 100 μm at 37.8° C. under a relative humidity of 100%,
has a haze per thickness 100 μm of at most 3%, and
has tensile elongations in MD and in TD at 23° C. of respectively at least 30%.

10. The process according to claim 1, wherein the heat treatment is carried out such that a density of the film is 2.173 g/cm³ or less.

11. A process for producing a laminate, comprising:
producing a film by the process according to claim 1; and
laminating the film and at least one other layer.

12. A process for producing a packaging material, comprising:
producing a laminate by the process according to claim 11; and
forming at least one pocket portion in the laminate.

13. A process for producing a packaging material for blister packaging; comprising:
producing a laminate by the process according to claim 11;
forming at least one pocket portion in the laminate; and
sealing an opening portion of the pocket portion with a cover.

14. The process according to claim 1, wherein the film is not subjected to an orientation treatment.

15. The process according to claim 1, wherein a difference $(T_1-T_{r1})$ between the surface temperature of the extruded film when brought into contact with the cooling roll ($T_1$) and the surface temperature of the cooling roll ($T_{r1}$) is at least 100° C.

16. The process according to claim 1, wherein the surface temperature of the extruded film when brought into contact with the cooling roll is at least the crystallization temperature of the polychlorotrifluoroethylene+10° C.

* * * * *